US011299147B2

(12) United States Patent
Kang

(10) Patent No.: US 11,299,147 B2
(45) Date of Patent: Apr. 12, 2022

(54) DRIVER ASSISTANCE SYSTEM AND CONTROL METHOD THEREOF

(71) Applicant: MANDO CORPORATION, Pyeongtaek-si (KR)

(72) Inventor: Boryeon Kang, Seongnam-si (KR)

(73) Assignee: Mando Mobility Solutions Corporation, Pyeongtaek-si (KR)

(*) Notice: Subject to any disclaimer, the term of this patent is extended or adjusted under 35 U.S.C. 154(b) by 0 days.

(21) Appl. No.: 16/715,671

(22) Filed: Dec. 16, 2019

(65) Prior Publication Data

US 2020/0238982 A1 Jul. 30, 2020

(30) Foreign Application Priority Data

Jan. 30, 2019 (KR) .................. 10-2019-0011785

(51) Int. Cl.
*B60W 30/09* (2012.01)
*B60W 60/00* (2020.01)
*B60R 11/04* (2006.01)
*B60W 10/18* (2012.01)
*B60W 10/20* (2006.01)
(Continued)

(52) U.S. Cl.
CPC ............. *B60W 30/09* (2013.01); *B60R 11/04* (2013.01); *B60W 10/18* (2013.01); *B60W 10/20* (2013.01); *B60W 60/0015* (2020.02); *B62D 15/0265* (2013.01); *G05D 1/0214* (2013.01); *G05D 1/0246* (2013.01); *G05D 1/0257* (2013.01); *B60W 2420/42* (2013.01);
(Continued)

(58) Field of Classification Search
CPC ... B60W 30/09; G05D 1/0246; G05D 1/0257; G01S 13/931
See application file for complete search history.

(56) References Cited

U.S. PATENT DOCUMENTS 6,636,148 B2 * 10/2003 Higuchi ............... G05D 1/0246
340/435
6,744,380 B2 * 6/2004 Imanishi .................. B60R 1/00
340/937
(Continued)

FOREIGN PATENT DOCUMENTS

EP 3141926 A1 3/2017
WO 2018/074287 A1 4/2018

OTHER PUBLICATIONS

Extended European Search Report issued in European Patent Application No. 19219610.3 dated Jun. 22, 2020.

*Primary Examiner* — Peter D Nolan
*Assistant Examiner* — Tarek Elarabi
(74) *Attorney, Agent, or Firm* — Morgan, Lewis & Bockius LLP

(57) ABSTRACT

Disclosed are a driver assistance system for a vehicle, the driver assistance system comprising: a camera disposed on the vehicle to have a field of view of an outside of the vehicle, and configured to acquire external image data; a radar disposed on the vehicle to have a field of sensing of an outside of the vehicle, and configured to acquire radar data; and a controller including a processor configured to process the image data and the radar data, determine a cut-in area of a nearby vehicle on the basis of the image data acquired by the camera, determine a target vehicle on the basis of the determined cut-in area, and control at least one of a braking device or a steering device of the vehicle to avoid a collision with the target vehicle.

30 Claims, 6 Drawing Sheets

(51) Int. Cl.
 *B62D 15/02* (2006.01)
 *G05D 1/02* (2020.01)
(52) U.S. Cl.
 CPC ..... *B60W 2420/52* (2013.01); *B60W 2552/00* (2020.02); *B60W 2554/402* (2020.02)

(56) References Cited

U.S. PATENT DOCUMENTS

| | | | |
|---|---|---|---|
| 6,894,608 B1* | 5/2005 | Gunderson | B60Q 1/525 |
| | | | 340/468 |
| 7,444,241 B2 | 10/2008 | Grimm | |
| 9,460,627 B2* | 10/2016 | Minemura | G08G 1/16 |
| 10,460,182 B1* | 10/2019 | Park | G01S 7/415 |
| 2002/0027503 A1 | 3/2002 | Higuchi | |
| 2007/0150196 A1* | 6/2007 | Grimm | G06K 9/00805 |
| | | | 701/301 |
| 2014/0324330 A1* | 10/2014 | Minemura | G08G 1/16 |
| | | | 701/301 |
| 2018/0141545 A1 | 5/2018 | Freytag | |
| 2019/0263344 A1* | 8/2019 | Yokoi | B60W 30/09 |
| 2020/0082248 A1* | 3/2020 | Villegas | G05D 1/0221 |

\* cited by examiner

DRIVER ASSISTANCE SYSTEM AND CONTROL METHOD THEREOF

CROSS-REFERENCE TO RELATED APPLICATION

This application is based on and claims priority under 35 U.S.C. § 119 to Korean Patent Application No. 10-2019-0011785, filed on Jan. 30, 2019 in the Korean Intellectual Property Office, the disclosure of which is incorporated herein by reference.

BACKGROUND

1. Field

The present disclosure relates to a driver assistance system, and more specifically, to a driver assistance system capable of avoiding a collision with a surrounding object in a travelling situation, and a control method thereof.

2. Description of the Related Art

Generally, a vehicle refers to a movement device or transportation device, designed to travel on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

Examples of the ADAS mounted on a vehicle include a forward collision avoidance (FCA) system, autonomous emergency brake (AEB) system, a driver attention warning (DAW) system, and the like. Such a system is designed to provide collision avoidance and warning by determining the hazard of a collision with an object in a travelling situation of a vehicle and performing an emergency braking in a collision situation.

SUMMARY

Therefore, it is an object of the present disclosure to provide a driver assistance system and method capable of avoiding a collision with a surrounding object existing in a close range in a travelling situation of a vehicle.

Additional aspects of the disclosure will be set forth in part in the description which follows and, in part, will be obvious from the description, or may be learned by practice of the disclosure.

Therefore, it is an aspect of the present disclosure to provide a driver assistance system for a vehicle, the driver assistance system including: a camera disposed on the vehicle to have a field of view of an outside of the vehicle, and configured to acquire external image data; a radar disposed on the vehicle to have a field of sensing of an outside of the vehicle, and configured to acquire radar data; and a controller including a processor configured to process the image data and the radar data, determine a cut-in area of a nearby vehicle on the basis of the image data acquired by the camera, determine a target vehicle on the basis of the determined cut-in area, and control at least one of a braking device or a steering device of the vehicle to avoid a collision with the target vehicle.

The controller may acquire lane information regarding a travel lane of the vehicle and sensing information regarding the nearby vehicle on the basis of the image data, and the sensing information may include at least one of vertex coordinates, longitudinal minimum coordinates, lateral minimum coordinates, longitudinal maximum coordinates, lateral maximum coordinates, a width, a length or a heading angle, of the nearby vehicle, and the lane information may include at least one of coordinates, a trajectory, a width, an angle or an interval, of the travel lane.

The controller may acquire coordinates of a contact point of the travel lane and the nearby vehicle on the basis of the image data, wherein the sensing information may further include the acquired coordinates of the contact point.

The controller may determine the cut-in area of the nearby vehicle on the basis of the lane information, the coordinates of the contact point, and the vertex coordinates of the nearby vehicle.

The controller may determine the nearby vehicle on the basis of the image data, wherein the nearby vehicle may be a vehicle existing in a lane of at least one of a left side or a right side of the travel lane of the vehicle.

The controller may determine whether the nearby vehicle is predicted to cut in the travel lane on the basis of the image data, and when it is determined that the nearby vehicle is predicted to cut in the travel lane, determine the cut-in area of the nearby vehicle.

The controller may determine a lateral acceleration of the nearby vehicle on the basis of the image data, and when the determined lateral acceleration satisfies a predetermined condition, determine that the nearby vehicle is predicted to cut in the travel lane.

The controller may determine that a nearby vehicle having the determined cut-in area greater than or equal to a predetermined reference value is the target vehicle.

The controller may determine a velocity of the target vehicle on the basis of at least one of the radar data or the image data, determine a target acceleration on the basis of the velocity of the target vehicle, and output a braking signal for a longitudinal avoidance to the braking device on the basis of the target acceleration.

The controller may output a steering signal for a lateral avoidance to the steering device when the longitudinal avoidance is impossible.

It is another aspect of the present disclosure to provide a method of controlling a driver assistance system of a vehicle, the method including: acquiring image data of an outside of the vehicle; acquiring radar data regarding the outside of the vehicle; processing the image data and the radar data; determining a cut-in area of a nearby vehicle on the basis of the acquired image data; determining a target vehicle on the basis of the determined cut-in area; and controlling at least one of a braking device or a steering device of the vehicle to avoid a collision with the target vehicle.

The method may further include acquiring lane information regarding a travel lane of the vehicle and sensing information regarding the nearby vehicle on the basis of the image data, wherein the sensing information may include at least one of vertex coordinates, longitudinal minimum coordinates, lateral minimum coordinates, longitudinal maximum coordinates, lateral maximum coordinates, a width, a length or a heading angle, of the nearby vehicle, and the lane information may include at least one of coordinates, a trajectory, a width, an angle or an interval, of the travel lane.

The acquiring of the sensing information regarding the nearby vehicle may include: acquiring coordinates of a contact point of the travel lane and the nearby vehicle on the basis of the image data, wherein the sensing information may further include the acquired coordinates of the contact point.

The determining of the cut-in area of the nearby vehicle may include determining the cut-in area of the nearby vehicle on the basis of the lane information, the coordinates of the contact point, and the vertex coordinates of the nearby vehicle.

The method may further include determining the nearby vehicle on the basis of the image data, wherein the nearby vehicle may be a vehicle existing in a lane of at least one of a left side or a right side of the travel lane of the vehicle.

The determining of the cut-in area of the nearby vehicle may include: determining whether the nearby vehicle is predicted to cut in the travel lane on the basis of the image data; and when it is determined that the nearby vehicle is predicted to cut in the travel lane, determining the cut-in area of the nearby vehicle.

The determining of whether the nearby vehicle is predicted to cut in the travel lane may include: determining a lateral acceleration of the nearby vehicle on the basis of the image data; and when the lateral acceleration of the nearby satisfies a predetermined condition, determining that the nearby vehicle is predicted to cut in the travel lane.

The determining of the target vehicle may include determining that a nearby vehicle having the determined cut-in area greater than or equal to a predetermined reference value is the target vehicle.

The controlling of the at least one of the braking device or the steering device of the vehicle may include: determining a velocity of the target vehicle on the basis of at least one of the radar data or the image data; determining a target acceleration on the basis of the velocity of the target vehicle; and outputting a braking signal for a longitudinal avoidance to the braking device on the basis of the target acceleration.

The controlling of the at least one of the braking device or the steering device of the vehicle may include outputting a steering signal for a lateral avoidance to the steering device when the longitudinal avoidance is impossible.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
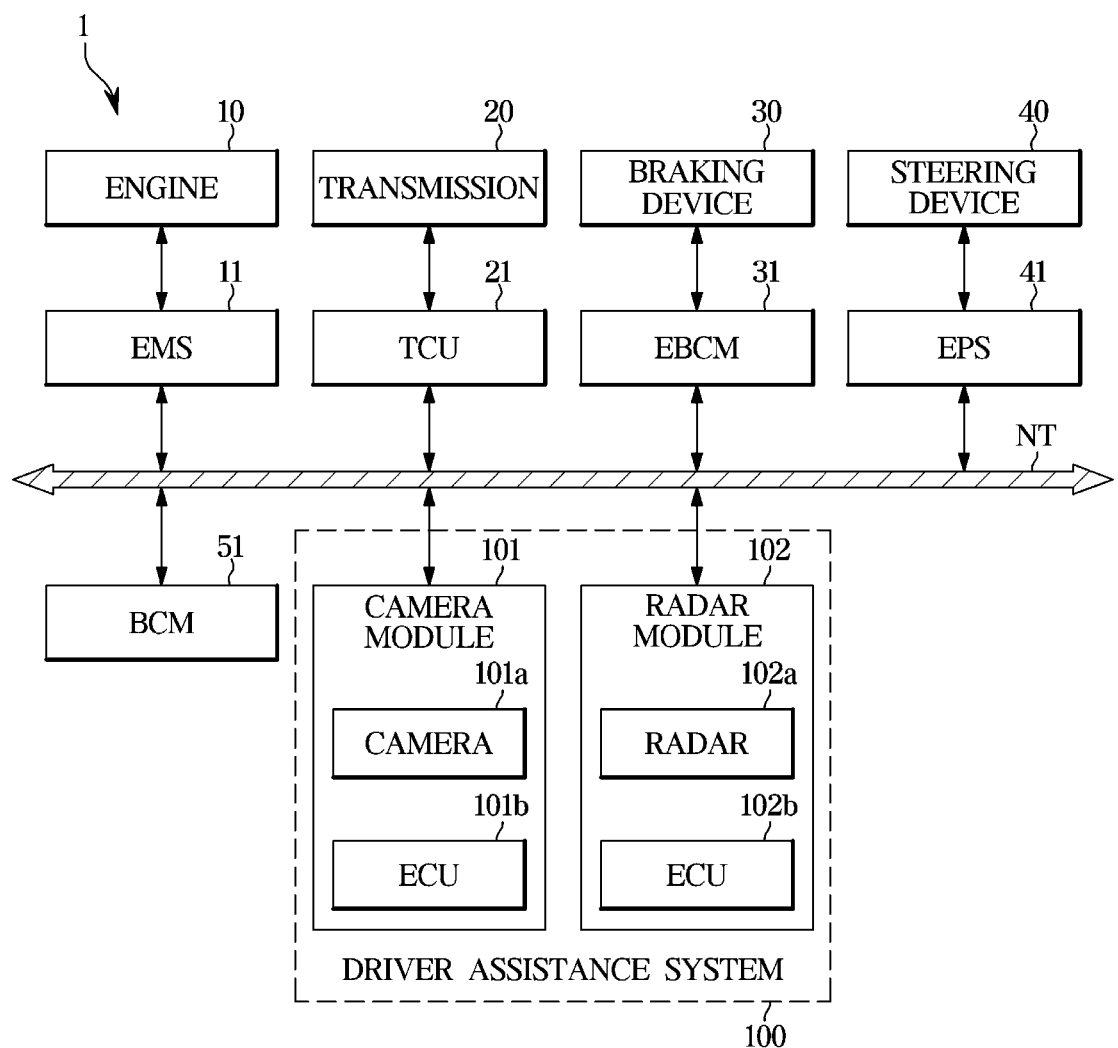
FIG. 1 is a block diagram illustrating a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to an acceleration intention of the driver through an accelerator pedal or a request from the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The DAS 100 may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The DAS 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The DAS 100 includes a camera module 101 that acquires image data of the surrounding of the vehicle 1 and a radar module 102 that acquires object data of the surrounding of the vehicle 1.

The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like. The camera 101 may be an image acquisition device comprising, but not limited to, a charge-coupled device (CCD), a CMOS image sensor, or a photo sensor including photodiodes.

The radar module 102 may include a radar 102a and an ECU 102b, and acquire a relative position, a relative velocity, and the like of an object of the surrounding of the vehicle 1 (e.g., another vehicle, a pedestrian, a cyclists, and the like).

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively.

Figure 2:
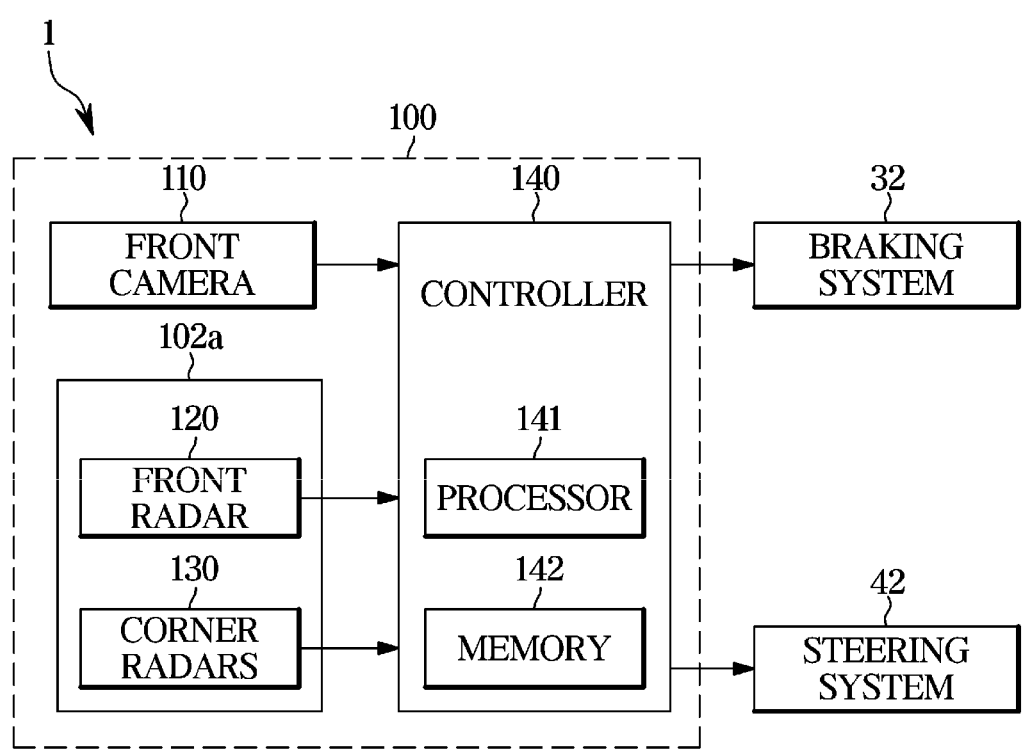
FIG. 2 is a block diagram illustrating a configuration of a driver assistance system according to an embodiment.
Figure 3:
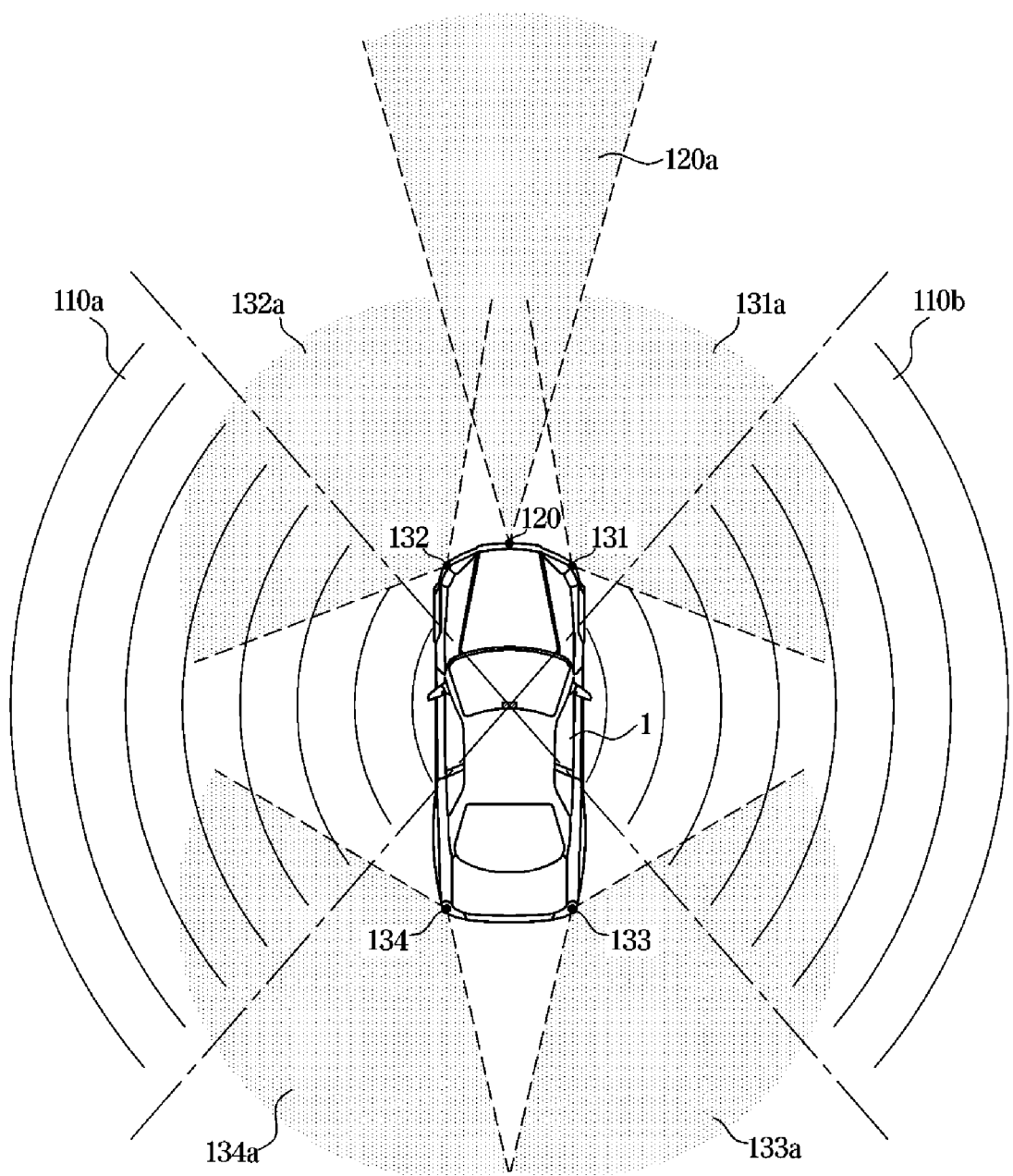
FIG. 3 is a view illustrating a camera and a radar included in a driver assistance system according to an embodiment.

FIG. 2 is a block diagram illustrating a configuration of a DAS according to an embodiment. FIG. 3 is a view illustrating a camera and a radar included in a DAS according to an embodiment.

Referring to FIG. 2, the vehicle 1 may include a braking system 32, a steering system 42, and a DAS 100.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The DAS 100 may include a front camera 110, a front radar 120, and a plurality of corner radars 130.

The front camera 110 may photograph the front of the vehicle 1 and acquire image data of the front of the vehicle 1. The image data of the front of the vehicle 1 may include position information of another vehicle, a pedestrian, a cyclist, or a lane existing in front of the vehicle 1.

In addition, the front camera 110 may have fields of view 110a and 110b directed toward lateral sides of the vehicle 1 as well as the front of the vehicle 1, as shown in FIG. 3.

The front camera 110 may acquire external image data of the surrounding of the vehicle 1, the external image data including visual information regarding not only the front of the vehicle but also the lateral side of the vehicle 1. The external image data of the vehicle 1 may include positional information of another vehicle, a pedestrian, a cyclist, or a lane positioned in at least one of the front or the lateral side of the vehicle 1.

To this end, the front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit the external image data of the surrounding of the vehicle 1 including at least one of the front or the lateral side of the vehicle 1 to the controller 140.

Meanwhile, the front camera 110 may be installed at a position capable of obtaining a field of view of the front or the lateral side of the vehicle 1, for example, the front camera 110 may be installed on a front windshield of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The front radar 120 may be installed at a position capable of acquiring information regarding the front of the vehicle 1, for example, the front radar 120 may be installed on a grille or a bumper of the vehicle 1.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed toward the front right side of the vehicle 1 as shown in FIG. 3. The first corner radar 131 may be installed on the right side of the front bumper of the vehicle 1, for example. The second corner radar 132 may have a field of sensing 132a directed toward the front left side of the vehicle 1, and may be installed on the left side of the front bumper of the vehicle 1, for example. The third corner radar 133 may have a field of sensing 133a directed toward the rear right side of the vehicle 1 and may be installed on the right side of the rear bumper of the vehicle 1, for example. The fourth corner radar 134 may have a field of sensing 134a directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 140 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 140.

The radar 102a including the front radar 120 and the plurality of corner radars 130 described above may transmit the front radar data of the front radar 120 and the corner radar data of the plurality of corner radars 130 to the controller 140.

The controller 140 may include the ECU (101b in FIG. 1) of the camera module (101 in FIG. 1) and/or the ECU (102b in FIG. 1) of the radar module (102 in FIG. 1), and/or an integrated ECU.

The controller 140 includes a processor 141 and a memory 142.

The processor 141 may process the external image data of the front camera 110 and the radar data of the radar 102a, and generate a braking signal and a steering signal for controlling the braking system 32 and the steering system 42. For example, the processor 141 may include an image signal processor for processing external image data of the front camera 110 and/or a digital signal processor for processing radar data of the radar 102a and/or a micro control unit (MCU) for generating a braking signal and a steering signal.

The processor 141 may determine objects (e.g., another vehicle, a pedestrian, a cyclist, and the like) front or lateral side of the vehicle 1 by processing the external image data of the front camera 110 and the radar data of the radar 102a.

In detail, the processor 141 may acquire position information (distance and direction) and velocity information (relative velocity) of the object in front of or behind the vehicle 1 on the basis of the radar data of the radar 102a. The processor 141 may acquire position information (direction) and type information (for example, whether the object is another vehicle, a pedestrian, or a cyclist) of the object in front of or behind the vehicle 1 on the basis of the external image data of the front camera 110. In addition, the processor 141 allows the object sensed by the external image data to match the object sensed by the radar data, and acquires the type information, the position information, and the velocity information of the surrounding objects of the vehicle 1 on the basis of a result of the matching.

The processor 141 may generate a braking signal and a steering signal on the basis of the type information, the position information, and the velocity information of the surrounding objects.

For example, the processor 141 calculates a time to collision (TTC) between the vehicle 1 and the surrounding object on the basis of the position information (distance) and the velocity information (relative velocity) of the surrounding object, and warns the driver of a collision or transmits a braking signal to the braking system 32 on the basis of a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) on the basis of the velocity information (relative speed) of surrounding objects, and warn the driver of a collision or transmit a braking signal to the braking system 32 on the basis of a result of comparing the DTC with distances to the surrounding objects.

The processor 141 may acquire position information (distance and direction) and velocity information (relative velocity) of the objects on the sides of the vehicle 1 (front right, front left, rear right, and rear left) on the basis of corner radar data of the plurality of corner radars 130.

As such, the controller 140 may transmit a control signal to the braking system 32 or the steering system 42 on the basis of whether a collision with the front or side object is predicted to occur.

When a collision with a side object is predicted to occur, the controller 140 transmits a braking signal to the braking system 32 to avoid a collision with the side object, to perform a longitudinal avoidance. When a collision with the side object is predicted to occur after the braking signal for longitudinal avoidance is transmitted, the controller 140 transmits a steering signal to the steering system 42 to avoid a collision with the side object, to perform a lateral avoidance.

In addition, when a side object is not present or a collision with a side object is not predicted to occur, the controller 140 may transmit a steering signal to the steering system 42 to avoid a collision with a front object. When a collision with a side object is predicted to occur after the steering, the controller 140 may not transmit the steering signal to the steering system 42.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the radars 120 and 130, and may temporarily store a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like. The programs stored in the memory 142, when executed by the processor 141, causes the processor 141 (or the controller 140 including the processor 141) to perform the operations/functions described in the specification.

At least one of the components may be omitted or add to correspond to the performances of the components of the vehicle 1 shown in FIGS. 1 and 2. In addition, it should be understood that the positions of the components may be changed to correspond to the performance and structure of the system without being limited.

Meanwhile, the components shown in FIGS. 1 and 2 refer to software components and/or hardware components, such as a field programmable gate array (FPGA) and an application specific integrated circuit (ASIC).

Figure 4:
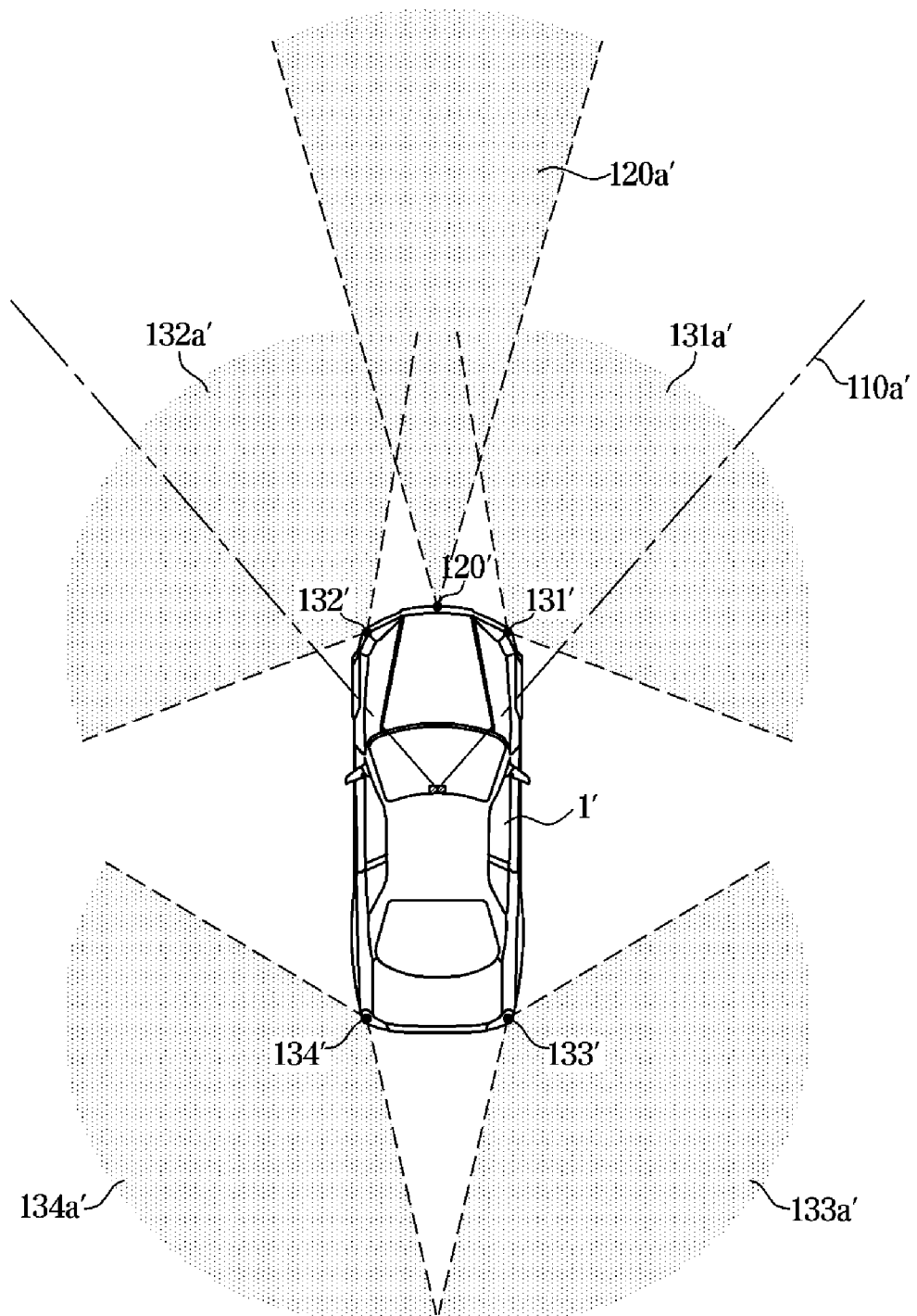
FIG. 4 is a view illustrating a camera and a radar included in a conventional driver assistance system.

FIG. 4 is a view illustrating a camera and a radar included in a conventional driver assistance system.

Referring to FIG. 4, a front camera 110' included in the conventional driver assistance system may have a field of view 110a' directed toward the front of a vehicle 1'.

In addition, a front radar 120' may have a field of sensing 120a' directed toward to the front of the vehicle 1' as shown in FIG. 4.

The angle of the field of view 110a' of the front camera 110' or the field of sensing 120a' of the first radar 120' is limited with respect to the front of the vehicle 1'. Accordingly, it is difficult to acquire information about a surrounding object located outside the limited angle of field of view 110a' or field of sensing 120a'.

For example, when a nearby vehicle located close to the vehicle 1' is cut in the travel lane of the vehicle 1', the vehicle cut in at a close range may not be sensed due to the limited angle of field of view 110a' or field of sensing 120a'. Accordingly, it is important to prevent collision with surrounding objects located outside the limited angle of field of view 110a' or field of sensing 120a'.

The following description will be made in relation to an operation of the driver assistance system 100 according to an embodiment capable of preventing a collision occurring due to the limited angle of field of view 110a' or field of sensing 120a' of the conventional driver assistance system and more rapidly detecting a vehicle cut in at a close range.

Figure 5:
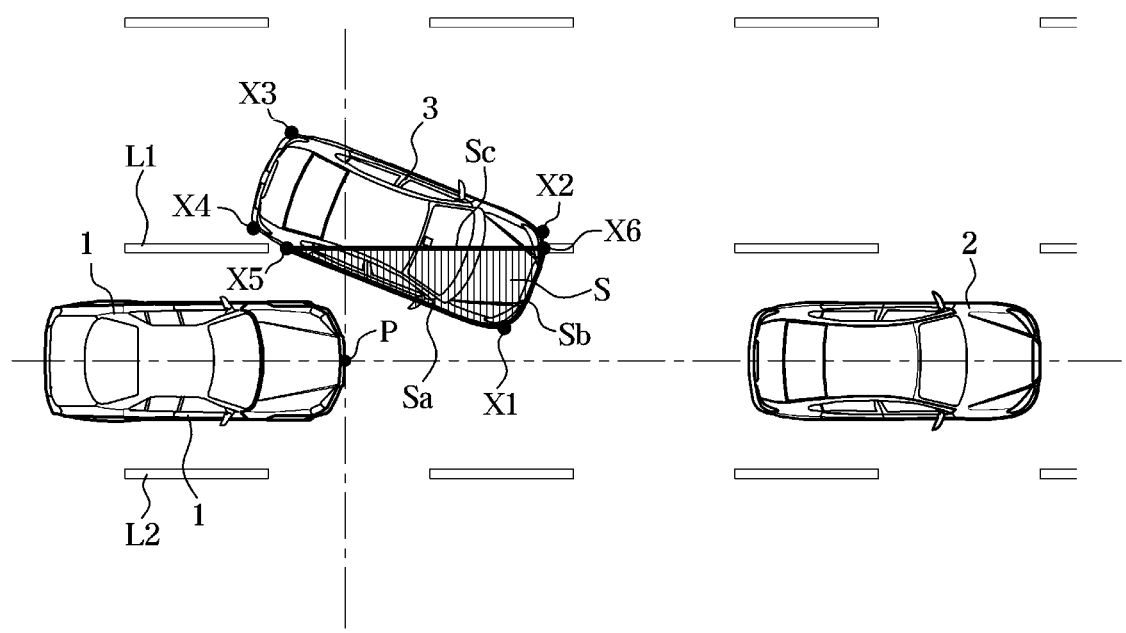
FIG. 5 is a view for describing an operation for avoiding a collision with a vehicle that cuts in a travel lane of a vehicle implemented with a driver assistance system according to an embodiment.

FIG. 5 is a view for describing an operation for avoiding a collision with a vehicle that cuts in a travel lane of a vehicle implemented with a driver assistance system according to an embodiment.

Referring to FIG. 5, the controller 140 according to the embodiment may determine a nearby vehicle on the basis of the external image data acquired by the front camera 110. In this case, the nearby vehicle represents a vehicle existing in a lane of at least one of a left side or a right side of the travel lane of the vehicle 1.

To this end, the controller 140 may acquire lane information regarding a travel lane of the vehicle 1 and sensing information regarding a nearby vehicle on the basis of the external image data acquired by the front camera 110.

In this case, the lane information represents information regarding a travel lane of the vehicle 1, and may include at least one of the position, coordinates, trajectory, width, angle, and interval of the travel lane. However, the lane information according to the present disclosure is not limited thereto, and may include various pieces of information regarding the travel lane of the vehicle 1.

The sensing information represents information regarding a vehicle existing at a surrounding of the vehicle 1, and may include at least one of vertex coordinates, longitudinal minimum coordinates, lateral minimum coordinates, longitudinal maximum coordinates, lateral maximum coordinates, a width, a length, and a heading angle of a nearby vehicle. In this case, the vertex coordinates of the nearby vehicle represents a point where edges of the nearby vehicle meet. In addition, the sensing information may include various pieces of other information regarding the nearby vehicle at a surrounding of the vehicle 1.

Further, the controller 140 may determine whether the nearby vehicle makes a contact with the travel lane on the basis of the external image data, and when the nearby vehicle makes a contact with the travel lane, the coordinates of a contact point of the travel lane and the nearby vehicle may be acquired.

In this case, the sensing information may further include the coordinates of the contact point of the travel lane of the vehicle 1 and the nearby vehicle.

When the nearby vehicle is determined, the controller 140 may determine whether the nearby vehicle is predicted to cut in the travel lane on the basis of the external image data.

In detail, the controller 140 may calculate a lateral acceleration of the nearby vehicle on the basis of the external image data, and determine whether the nearby vehicle is predicted to cut in on the travel lane on the basis of whether the calculated lateral acceleration satisfies a predetermined first condition. In this case, the sensing information may further include the lateral acceleration of the nearby vehicle.

Alternatively, the controller 140 may determine whether the nearby vehicle is predicted to cut in the travel lane on the basis of whether the heading angle of the nearby vehicle acquired on the basis of the external image data satisfies a predetermined second condition.

In addition, the controller 140 may calculate a cut-in area S of the nearby vehicle on the basis of the external image data.

In detail, when it is determined that the nearby vehicle is predicted to cut in the travel lane, the controller 140 may calculate the cut-in area of the nearby vehicle on the basis of the lane information and the sensing information regarding the nearby vehicle that are acquired on the basis of the external image data.

The controller 140 may calculate the cut-in area of the nearby vehicle using the coordinates of the point where the nearby vehicle makes a contact with the travel lane, that is, the contact point of the nearby vehicle and the travel lane on the basis of the lane information and the sensing information.

In detail, the controller 140 may calculate the cut-in area of the nearby vehicle on the basis of the coordinates of the contact point of the nearby vehicle and the travel lane and the vertex coordinates of the nearby vehicle. In this case, the vertex coordinates of the nearby vehicle may represent the coordinates of a vertex at the maximum distance from the travel lane among vertices located within the travel lane. In addition, the vertex coordinates of the vertex of the nearby vehicle may be the coordinates of a vertex having the longitudinal maximum coordinates from the travel lane.

The controller 140 may calculate the cut-in area of the nearby vehicle on the basis of the coordinates of the contact point of the nearby vehicle and the travel lane, the vertex coordinates of the nearby vehicle, and the heading angle of the nearby vehicle.

The operations/functions of the controller 140 may be performed by the processor 141 when the processor 141 executes software, program, or codes stored in the memory 142.

For example, referring to FIG. 5, when a nearby vehicle 3 cuts in a travel lane L1, the controller 140 may calculate a cut-in area S of the nearby vehicle 3 on the basis of coordinates of contact points X5 and X6 of the nearby vehicle 3 and the travel lane L1, and coordinates of vertexes X1, X2, X3, and X4 of the nearby vehicle 3.

The controller 140 may calculate the cut-in area S of the nearby vehicle 3 on the basis of the heading angle of the nearby vehicle 3, the coordinates of the contact points X5 and X6 of the nearby vehicle 3 and the travel lane L1, and the coordinates of the vertex X1 located within the travel lane L1 and having the longitudinal maximum coordinates from the travel lane L1.

In this case, the controller 140 may calculate the distances Sa, Sb, and Sc between vertexes of a polygon forming the cut-in area S, to calculate the cut-in area S.

The controller 140 may determine a target vehicle 2 on the basis of the cut-in area of the nearby vehicle, and may control at least one of the braking system 32 or the steering system 42 to avoid a collision with the target vehicle 2. In this case, the target vehicle 2 represents a vehicle for which a collision is avoided.

In detail, the controller 140 may determine the target vehicle 2 on the basis of whether the cut-in area of the nearby vehicle 3 is equal to or larger than a predetermined reference value, and calculate a target acceleration on the basis of the velocity of the target vehicle 2. To this end, the controller 140 may calculate the velocity (relative velocity) of the target vehicle 2 on the basis of at least one of the radar data acquired by the radar 102*a* or the external image data acquired by the front camera 110.

The controller 140 may calculate the target acceleration on the basis of the velocity of the target vehicle 2. The target acceleration represents an acceleration required to avoid a collision with the target vehicle 2, and an acceleration required to perform a longitudinal avoidance on the target vehicle 2.

The controller 140 may output a braking signal for the longitudinal avoidance to the braking system 32 on the basis of the target acceleration.

When the collision with the target vehicle 2 is predicted to occur or the longitudinal avoidance is impossible even after the braking signal for the longitudinal avoidance is transmitted, the controller 140 outputs a steering signal for a lateral avoidance to the steering system 42.

Meanwhile, when there are a plurality of nearby vehicles, the controller 140 may calculate cut-in areas of the plurality of nearby vehicles, and may determine a nearby vehicle having the largest cut-in area as the target vehicle among the plurality of nearby vehicles. In the following description, details identical to those described above will be omitted.

Figure 6:
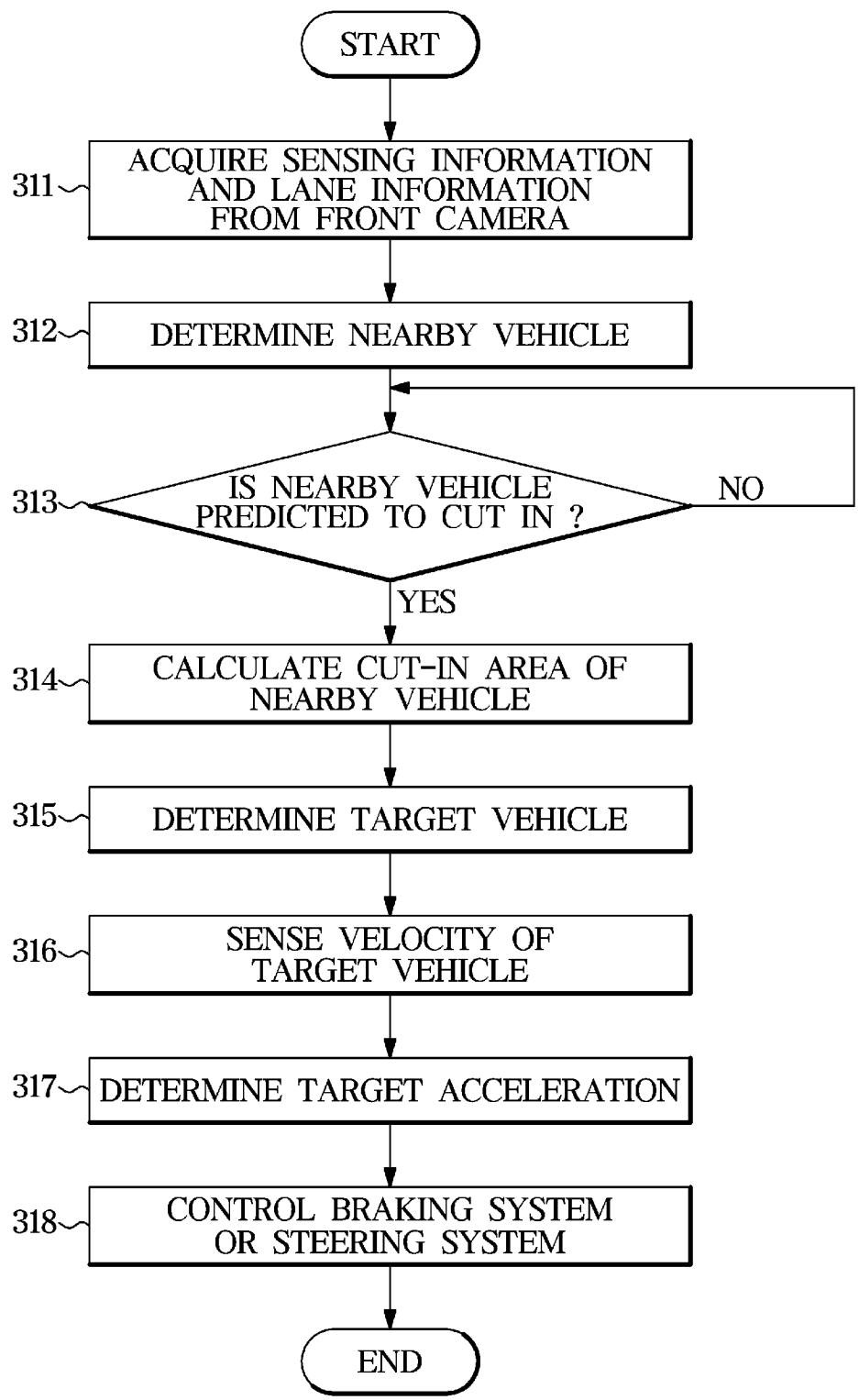
FIG. 6 is a flowchart showing a method of controlling a driver assistance system according to an embodiment.

FIG. 6 is a flowchart showing a method of controlling a driver assistance system according to an embodiment.

Referring to FIG. 6, the driver assistance system 100 according to the embodiment may acquire sensing information and lane information from the front camera 110 (311). In detail, the driver assistance system 100 may acquire the sensing information and the lane information on the basis of the external image data acquired from the front camera 110.

In this case, the lane information represents information regarding a travel lane of the vehicle 1, and may include at least one of the position, coordinates, trajectory, width, angle, or interval of the travel lane. However, the lane information according to the present disclosure is not limited thereto, and may include various pieces of information regarding the travel lane of the vehicle 1.

In addition, the sensing information represents information regarding a vehicle existing at a surrounding of the vehicle 1, and may include at least one of vertex coordinates, longitudinal minimum coordinates, lateral minimum coordinates, longitudinal maximum coordinates, lateral maximum coordinates, a width, a length, or a heading angle, of a nearby vehicle. In this case, the vertex coordinates of the nearby vehicle represents a point where edges of the nearby vehicle meet. In addition, the sensing information may include various pieces of other information regarding the nearby vehicle at a surrounding of the vehicle 1, and may further include the coordinates of a contact point of the travel lane and the nearby vehicle or the lateral acceleration of the nearby vehicle.

Then, the driver assistance system 1 may determine a nearby vehicle on the basis of the lane information and the sensing information (312). In this case, the nearby vehicle represents a vehicle in a lane of at least one of a left side or a right side of the travel lane of the vehicle 1.

When the nearby vehicle is determined, the driver assistance system 1 may determine whether the nearby vehicle is predicted to cut in the travel lane on the basis of the lane information and the sensing information (313). In detail, the driver assistance system 1 may determine whether the nearby vehicle is predicted to cut in the travel lane on the basis of whether a lateral acceleration of the nearby vehicle satisfies a predetermined first condition. Alternatively, the driver assistance system 100 may determine whether the nearby vehicle is predicted to cut in the travel lane on the basis of whether a heading angle of the nearby vehicle satisfies a predetermined second condition.

When it is determined that the nearby vehicle is predicted to cut in the travel lane (YES in operation 313), the driver assistance system 100 may calculate a cut-in area of the nearby vehicle (314).

In detail, the driver assistance system 1 may calculate the cut-in area of the nearby vehicle on the basis of the lane information and the sensing information regarding the nearby vehicle that are acquired on the basis of the external image data.

The driver assistance system 1 may calculate the cut-in area of the nearby vehicle using the coordinates of the point where the nearby vehicle makes a contact with the travel lane, that is, the contact point of the nearby vehicle and the travel lane on the basis of the lane information and the sensing information.

The driver assistance system 100 may calculate the cut-in area of the nearby vehicles on the basis of the coordinates of the contact point of the nearby vehicle and the travel lane and the vertex coordinates of the nearby vehicle. In this case, the vertex coordinates of the nearby vehicle may represent the coordinates of a vertex at the maximum distance from the travel lane among vertices located within the travel lane. In addition, the vertex coordinates of the nearby vehicle may be the coordinates of a vertex having the longitudinal maximum coordinates from the travel lane.

The driver assistance system 100 may calculate the cut-in area of the nearby vehicle not only based on the coordinates of the contact point of the nearby vehicle and the travel lane and the vertex coordinates of the nearby vehicle but also based on the heading angle of the nearby vehicle.

Then, the driver assistance system 1 may determine a target vehicle on the basis of the cut-in area of the nearby vehicle (315). In this case, the target vehicle represents a vehicle for which a collision is avoided.

In detail, the driver assistance system 100 may determine the target vehicle on the basis of whether the cut-in area of the nearby vehicle is equal to or larger than a predetermined reference value. In this case, when there are a plurality of nearby vehicles, the driver assistance system 1 may calculate cut-in areas of the plurality of nearby vehicles, and may determine a nearby vehicle having the largest cut-in area as the target vehicle among the plurality of nearby vehicles.

When the target vehicle is determined, the driver assistance system 100 may sense the velocity of the target vehicle (316), and may determine the target acceleration on the basis of the velocity of the target vehicle (317). In this case, the target acceleration may represent an acceleration required to avoid a collision with the target vehicle, and may represent an acceleration required to perform a longitudinal avoidance on the target vehicle.

When the target acceleration is determined, the driver assistance system 1 may control at least one of the braking system 32 or the steering system 42 on the basis of the target acceleration (318).

In detail, the driver assistance system 100 may output a braking signal for the longitudinal avoidance to the braking system 32 on the basis of the target acceleration.

When the collision with the target vehicle is predicted to occur or the longitudinal avoidance is impossible even after the braking signal for the longitudinal avoidance is transmitted, the driver assistance system 1 may output a steering signal for a lateral avoidance to the steering system 42.

Accordingly, a vehicle cut in the travel lane at a close range may be more rapidly sensed, so that an operation of avoiding a collision may be performed, and the driver may be provided with safer travelling environment.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the driver assistance system and the control method thereof can avoid a collision between a vehicle and a surrounding object, thus providing a driver with a safe travelling environment.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A driver assistance system comprising:
an image acquisition device disposed on a subject vehicle and configured to acquire external image data indicating a field of view of outside of the subject vehicle, wherein the image data includes a mark on a road indicating a travel lane along which the subject vehicle travels;
a radar disposed on the subject vehicle and configured to acquire radar data indicating a field of sensing of the outside of the subject vehicle; and
a controller including a processor, configured to:
process the image data and the radar data;
determine the travel lane of the subject vehicle on the basis of the image data;
determine an area of a portion of a nearby vehicle as a cut-in area of the nearby vehicle on the basis of the image data acquired by the image acquisition device;
determine a target vehicle on the basis of the determined cut-in area;
control at least one of a braking device or a steering device of the subject vehicle to avoid a collision with the target vehicle;
acquire lane information regarding the travel lane of the subject vehicle and sensing information regarding the nearby vehicle on the basis of the image data, wherein the sensing information includes at least one of vertex coordinates, longitudinal minimum coordinates, lateral minimum coordinates, longitudinal maximum coordinates, lateral maximum coordinates, a width, a length, or a heading angle, of the nearby vehicle, and
determine whether the nearby vehicle is predicted to cut in the travel lane based on the lane information and the sensing information,
when it is determined that the nearby vehicle is predicted to cut in the travel lane, determine the area of the portion of the nearby vehicle as the cut-in area of the nearby vehicle,
wherein the portion of the nearby vehicle is a portion, from the mark into the travel lane of the subject vehicle, occupied by the nearby vehicle in the travel lane of the subject vehicle.

2. The driver assistance system of claim 1, wherein the lane information includes at least one of coordinates, a trajectory, a width, an angle, or an interval, of the travel lane.

3. The driver assistance system of claim 2, wherein the controller acquires coordinates of a contact point of the travel lane and the nearby vehicle on the basis of the image data,
wherein the sensing information further includes the acquired coordinates of the contact point.

4. The driver assistance system of claim 3, wherein the controller determines the cut-in area of the nearby vehicle on the basis of the lane information, the coordinates of the contact point, and the vertex coordinates of the nearby vehicle.

5. The driver assistance system of claim 1, wherein the controller determines the nearby vehicle on the basis of the image data,
wherein the nearby vehicle is one vehicle existing in a lane of at least one of a left side or a right side of the travel lane of the subject vehicle.

6. The driver assistance system of claim 1, wherein the controller determines whether the nearby vehicle is predicted to cut in the travel lane on the basis of the image data, and
when the controller determines that the nearby vehicle is to cut in the travel lane, the controller determines the cut-in area of the nearby vehicle.

7. The driver assistance system of claim 6, wherein the controller determines a lateral acceleration of the nearby vehicle on the basis of the image data, and when the determined lateral acceleration satisfies a predetermined condition, the controller determines that the nearby vehicle is predicted to cut in the travel lane.

8. The driver assistance system of claim 1, wherein the controller determines that the nearby vehicle having the determined cut-in area greater than or equal to a predetermined reference value is the target vehicle.

9. The driver assistance system of claim 1, wherein the controller determines a velocity of the target vehicle on the basis of at least one of the radar data or the image data, determines a target acceleration on the basis of the velocity of the target vehicle, and outputs a braking signal for a longitudinal avoidance to the braking device on the basis of the target acceleration.

10. The driver assistance system of claim 9, wherein the controller outputs a steering signal for a lateral avoidance to the steering device.

11. The subject vehicle comprising the driver assistance system of claim 1.

12. A method of controlling a driver assistance system of a subject vehicle, the method comprising:
acquiring image data of an outside of the subject vehicle, wherein the image data includes a mark on a road indicating a travel lane along which the subject vehicle travels;
acquiring radar data regarding the outside of the subject vehicle;
processing the image data and the radar data;
determining the travel lane of the subject vehicle on the basis of the image data;
determining an area of a portion of a nearby vehicle as a cut-in area of the nearby vehicle on the basis of the acquired image data;
determining a target vehicle on the basis of the determined cut-in area;
controlling at least one of a braking device or a steering device of the subject vehicle to avoid a collision with the target vehicle;
acquiring lane information regarding the travel lane of the subject vehicle and sensing information regarding the nearby vehicle on the basis of the image data, wherein the sensing information includes at least one of vertex coordinates, longitudinal minimum coordinates, lateral minimum coordinates, longitudinal maximum coordinates, lateral maximum coordinates, a width, a length, or a heading angle, of the nearby vehicle; and
determining whether the nearby vehicle is predicted to cut in the travel lane based on the lane information and the sensing information,
wherein the determining of the area of the portion of the nearby vehicle as the cut-in area of the nearby vehicle is performed when it is determined that the nearby vehicle is predicted to cut in the travel lane, and
the portion of the nearby vehicle is a portion, from the mark into the travel lane of the subject vehicle, occupied by the nearby vehicle in the travel lane of the subject vehicle.

13. The method of claim 12,
wherein the lane information includes at least one of coordinates, a trajectory, a width, an angle or an interval, of the travel lane.

14. The method of claim 13, wherein the acquiring of the sensing information regarding the nearby vehicle includes:
acquiring coordinates of a contact point of the travel lane and the nearby vehicle on the basis of the image data,
wherein the sensing information further includes the acquired coordinates of the contact point.

15. The method of claim 14, wherein the determining of the cut-in area of the nearby vehicle includes determining the cut-in area of the nearby vehicle on the basis of the lane information, the coordinates of the contact point, and the vertex coordinates of the nearby vehicle.

16. The method of claim 12, further comprising determining the nearby vehicle on the basis of the image data,
wherein the nearby vehicle is one vehicle existing in a lane of at least one of a left side or a right side of the travel lane of the subject vehicle.

17. The method of claim 12, wherein the determining of the cut-in area of the nearby vehicle includes:
determining whether the nearby vehicle is predicted to cut in the travel lane on the basis of the image data; and
when it is determined that the nearby vehicle is predicted to cut in the travel lane, determining the cut-in area of the nearby vehicle.

18. The method of claim 17, wherein the determining of whether the nearby vehicle is predicted to cut in the travel lane includes:
determining a lateral acceleration of the nearby vehicle on the basis of the image data; and
when the lateral acceleration of the nearby satisfies a predetermined condition, determining that the nearby vehicle is predicted to cut in the travel lane.

19. The method of claim 12, wherein the determining of the target vehicle includes determining that the nearby vehicle having the determined cut-in area greater than or equal to a predetermined reference value is the target vehicle.

20. The method of claim 12, wherein the controlling of the at least one of the braking device or the steering device of the subject vehicle includes:
determining a velocity of the target vehicle on the basis of at least one of the radar data or the image data;
determining a target acceleration on the basis of the velocity of the target vehicle; and
outputting a braking signal for a longitudinal avoidance to the braking device on the basis of the target acceleration.

21. The method of claim 20, wherein the controlling of the at least one of the braking device or the steering device of the subject vehicle includes outputting a steering signal for a lateral avoidance to the steering device.

22. A driver assistance system comprising:
an image acquisition device disposed on a subject vehicle and configured to acquire external image data indicating a field of view of outside the subject vehicle, wherein the image data includes a mark on a road indicating a travel lane along which the subject vehicle travels; and
a processor configured to:
determine the travel lane of the subject vehicle on the basis of the image data;
determine an area of a portion of a nearby vehicle as a cut-in area of the nearby vehicle by processing at least the image data;

output a control signal to control at least one of a braking device or a steering device of the subject vehicle to avoid a collision with the nearby vehicle, in response to a determination that the cut-in area of the nearby vehicle is greater than a predetermined reference value;

acquire lane information regarding the travel lane of the subject vehicle and sensing information regarding the nearby vehicle on the basis of the image data, wherein the sensing information includes at least one of vertex coordinates, longitudinal minimum coordinates, lateral minimum coordinates, longitudinal maximum coordinates, lateral maximum coordinates, a width, a length, or a heading angle, of the nearby vehicle;

determine whether the nearby vehicle is predicted to cut in the travel lane based on the lane information and the sensing information; and when it is determined that the nearby vehicle is predicted to cut in the travel lane, determine the area of the portion of the nearby vehicle as the cut-in area of the nearby vehicle, wherein the portion of the nearby vehicle is a portion, from the mark into the travel lane of the subject vehicle, occupied by the nearby vehicle in the travel lane of the subject vehicle.

23. The driver assistance system of claim 22, wherein the lane information includes at least one of coordinates, a trajectory, a width, an angle, or an interval, of the travel lane.

24. The driver assistance system of claim 23, wherein the processor is further configured to determine coordinates of a contact point of the travel lane and the nearby vehicle on the basis of the image data, wherein the sensing information further includes the determined coordinates of the contact point.

25. The driver assistance system of claim 24, wherein the processor is further configured to determine the cut-in area of the nearby vehicle on the basis of the lane information, the coordinates of the contact point, and the vertex coordinates of the nearby vehicle.

26. The driver assistance system of claim 22, further comprising:

a radar disposed on the subject vehicle and configured to acquire radar data outside of the subject vehicle, wherein the processor is further configured to determine a velocity of the nearby vehicle on the basis of at least one of the radar data or the image data, determine a target acceleration on the basis of the velocity of the target vehicle, and output a braking signal for a longitudinal avoidance to the braking device on the basis of the target acceleration.

27. The driver assistance system of claim 22, wherein the processor is configured to output a steering signal for a lateral avoidance to the steering device, in response to a determination that the longitudinal avoidance occurs if controlling only the braking device.

28. The driver assistance system of claim 22, wherein the processor is further configured to:

determine a lateral acceleration of the nearby vehicle on the basis of the image data, and in response to a determination that the determined lateral acceleration satisfies a predetermined condition, determine that the nearby vehicle is to cut in the travel lane.

29. A method comprising:

receiving image data indicating a field of view of outside of a subject vehicle, wherein the image data includes a mark on a road indicating a travel lane along which the subject vehicle travels;

determining the travel lane of the subject vehicle on the basis of the image data;

determining an area of a portion of a nearby vehicle as a cut-in area of the nearby vehicle by processing at least the image data;

outputting a control signal to control at least one of a braking device or a steering device of the subject vehicle to avoid a collision with the nearby vehicle, in response to a determination that the cut-in area of the nearby vehicle is greater than a predetermined reference value;

acquiring lane information regarding the travel lane of the subject vehicle and sensing information regarding the nearby vehicle on the basis of the image data, wherein the sensing information includes at least one of vertex coordinates, longitudinal minimum coordinates, lateral minimum coordinates, longitudinal maximum coordinates, lateral maximum coordinates, a width, a length, or a heading angle, of the nearby vehicle; and determining whether the nearby vehicle is predicted to cut in the travel lane based on the lane information and the sensing information, wherein the determining of the area of the portion of the nearby vehicle as the cut-in area of the nearby vehicle is performed when it is determined that the nearby vehicle is predicted to cut in the travel lane, and the portion of the nearby vehicle is a portion, from the mark into the travel lane of the subject vehicle, occupied by the nearby vehicle in the travel lane of the subject vehicle.

30. A non-transitory computer-readable medium storing computer-executable instructions, when executed by a processor, causing the processor to perform the method of claim 29.

* * * * *